(12) United States Patent
Kawamoto et al.

(10) Patent No.: US 8,880,222 B2
(45) Date of Patent: Nov. 4, 2014

(54) ROBOT DEVICE, METHOD OF CONTROLLING ROBOT DEVICE, AND PROGRAM

(75) Inventors: Kenta Kawamoto, Tokyo (JP); Satoru Shimizu, Tokyo (JP); Toshimitsu Tsuboi, Tokyo (JP); Yasuhiro Suto, Tokyo (JP)

(73) Assignee: Sony Corporation, Tokyo (JP)

( * ) Notice: Subject to any disclaimer, the term of this patent is extended or adjusted under 35 U.S.C. 154(b) by 711 days.

(21) Appl. No.: 13/043,897

(22) Filed: Mar. 9, 2011

(65) Prior Publication Data

US 2011/0245974 A1 Oct. 6, 2011

(30) Foreign Application Priority Data

Mar. 31, 2010 (JP) .................................. 2010-082047

(51) Int. Cl.
*G05B 15/00* (2006.01)
*G05B 19/00* (2006.01)
*B25J 9/16* (2006.01)

(52) U.S. Cl.
CPC .................................... *B25J 9/1664* (2013.01)
USPC ...... 700/259; 700/245; 700/257; 318/568.12; 318/568.16

(58) Field of Classification Search
USPC ......... 700/245, 250, 253, 255, 257, 258, 259; 318/568.11, 568.12, 568.14, 568.16; 901/1, 46, 47; 74/490.01
See application file for complete search history.

(56) References Cited

U.S. PATENT DOCUMENTS

| | | | | |
|---|---|---|---|---|
| 5,864,779 A | * | 1/1999 | Fujimoto | 702/179 |
| 6,721,444 B1 | * | 4/2004 | Gu et al. | 382/154 |
| 6,760,645 B2 | * | 7/2004 | Kaplan et al. | 700/245 |
| 7,627,178 B2 | * | 12/2009 | Suzuki et al. | 382/190 |
| 8,483,930 B2 | * | 7/2013 | Kawaguchi et al. | 701/100 |
| 2005/0213818 A1 | * | 9/2005 | Suzuki et al. | 382/190 |
| 2009/0055019 A1 | * | 2/2009 | Stiehl et al. | 700/249 |
| 2009/0177323 A1 | * | 7/2009 | Ziegler et al. | 700/259 |

FOREIGN PATENT DOCUMENTS

| | | |
|---|---|---|
| JP | 2004-326693 | 11/2004 |
| JP | 2005-349497 | 12/2005 |

OTHER PUBLICATIONS

Kemp et al., A Point-and-Click Interface for the Real World: Laser Designation of Objects for Mobile Manipulation, HRI'08, Mar. 12-15, 2008, Amsterdam, The Netherlands, pp. 1-8.*

Nguyen et al., EI-E: An Assistive Robot that Fetches Objects from Flat Surfaces, The Robotic Helpers Workshop at HRI'08, Mar. 12, 2008, Amsterdam, The Netherlands, pp. 1-8.*

* cited by examiner

*Primary Examiner* — Khoi Tran
*Assistant Examiner* — Jaime Figueroa
(74) *Attorney, Agent, or Firm* — Oblon, Spivak, McClelland, Maier & Neustadt, L.L.P.

(57) ABSTRACT

There is provided a robot device including an instruction acquisition unit that acquires an order for encouraging a robot device to establish joint attention on a target from a user, a position/posture estimation unit that estimates a position and posture of an optical indication device, which is operated by the user to indicate the target by irradiation of a beam, in response to acquisition of the order, and a target specifying unit that specifies a direction of the target indicated by irradiation of the beam based on an estimation result of the position and posture and specifies the target on an environment map representing a surrounding environment based on a specifying result of the direction.

10 Claims, 14 Drawing Sheets

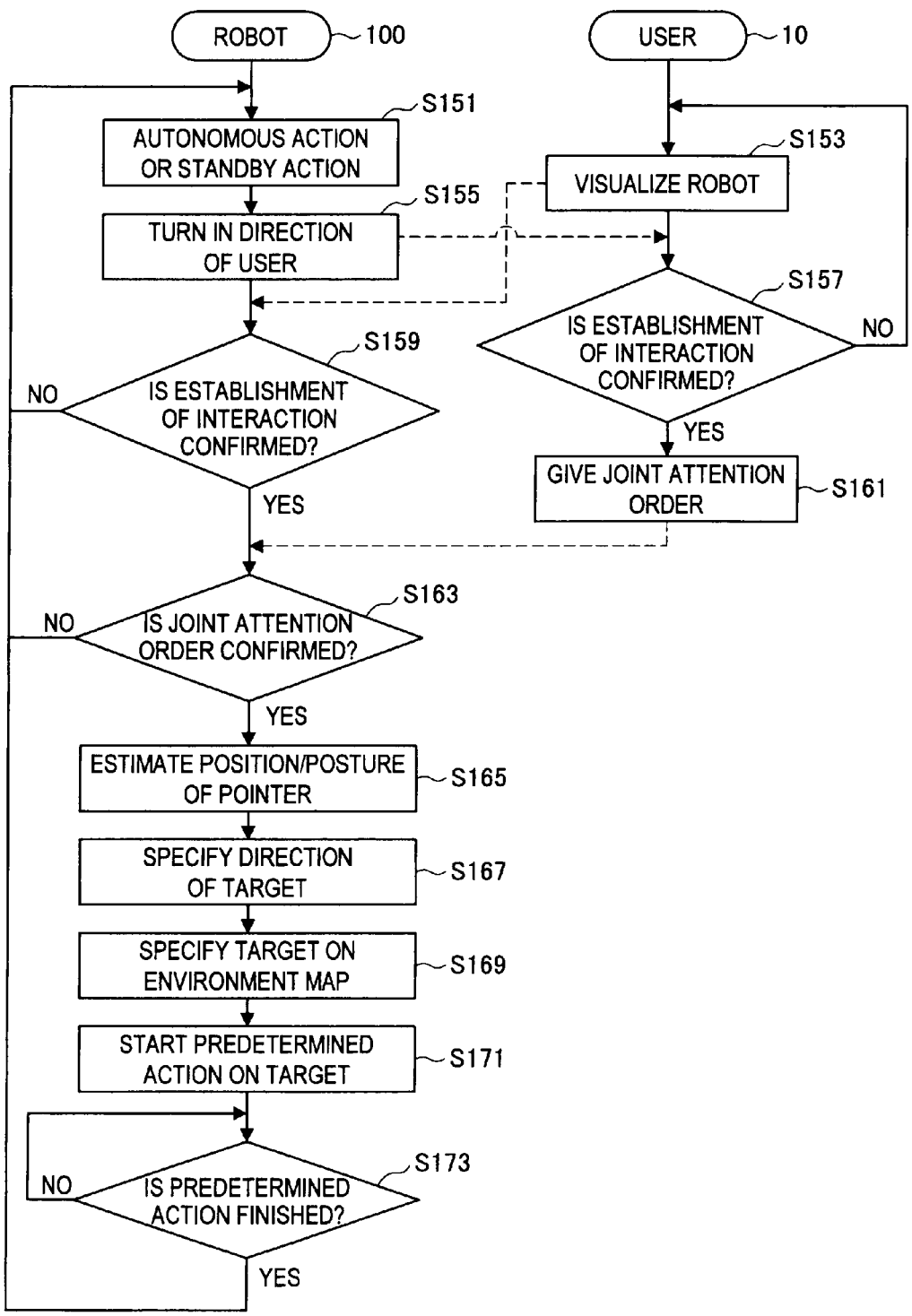

ROBOT DEVICE, METHOD OF CONTROLLING ROBOT DEVICE, AND PROGRAM

BACKGROUND OF THE INVENTION

1. Field of the Invention

The present invention relates to a robot device, a method of controlling the robot device, and a program.

2. Description of the Related Art

In recent years, robot devices (hereinafter, referred to as "robots") that behave together with users and act according to the users' orders have been in widespread use. In order for the robot to pay attention to the same target (an object or position) as the user does, it may be required to establish joint attention.

For example, when the user indicates a target and orders an action to the target, the target indicated by the user must be identical to a target that the robot specifies according to the user's order. In this case, although it is necessary to establish joint attention on the target between the user and the robot, it may be difficult to establish joint attention with certainty.

In the past, laser pointer recognition, gesture recognition, a touch panel operation, an acceleration sensor, and the like have been used for establishing joint attention on the target.

For example, Japanese Patent Application Laid-Open (JP-A) No. 2005-349497 discloses a control technique for controlling a robot using a remote controller in association with an acceleration sensor. In the control technique, if the user indicates a target through a pointer of the remote controller, the remote controller calculates the position indicated by the pointer based on a detection result of the acceleration sensor and transmits the calculation result to the robot. As a result, the robot can specify the position indicated by the pointer as the next movement position based on the calculation result.

SUMMARY OF THE INVENTION

In the case of using the laser pointer recognition, the user indicates a target through a high intensity laser and the robot performs recognition by detecting a high brightness point or area. In this case, if a dedicated filter is not mounted in a camera, detection robustness deteriorates due to influence of a lighting environment. However, if the dedicated filter is mounted, the camera cannot be used for any purpose other than detection of the high intensity laser. Further, in the case of using only the laser pointer recognition, if any high brightness point or area other than the target indicated by the user is present, a degree of accuracy of recognition cannot be sufficiently secured.

Further, in the case of using the gesture recognition, although the camera can be used for purposes other than the gesture recognition, the gesture recognition cannot sufficiently secure a degree of accuracy of recognition. Further, a target considered to be indicated by the user may be different from a target objectively recognized as being indicated by the user, leading to a difference in intention.

Further, in the case of using the touch panel operation, mapping between an actual space around the robot and a display space on a touch panel is necessary, and an interface is unnatural. Further, if the display resolution is low, a degree of accuracy for indicating a target may decrease, whereas if the resolution is high, it may become difficult to perform mapping.

Further, in the case of using the acceleration sensor, in the control technique disclosed in JP-A No. 2005-349497, if the acceleration sensor is not frequently reset, a detection error may be accumulated, and thus it may be difficult to specify the next movement position with a high degree of accuracy.

As described above, it was difficult to establish joint attention on a target between the robot and the user with certainty. Thus, in light of the foregoing, it is desirable to provide a robot device, a method of controlling the robot device, and a program in which establishment of joint attention on a target between the user and the robot can be supported.

According to an embodiment of the present invention, there is provide a robot device, including an instruction acquisition unit that acquires an order for encouraging a robot device to establish joint attention on a target from a user, a position/posture estimation unit that estimates a position and posture of an optical indication device, which is operated by the user to indicate the target by irradiation of a beam, in response to acquisition of the order, and a target specifying unit that specifies a direction of the target indicated by irradiation of the beam based on an estimation result of the position and posture and specifies the target on an environment map representing a surrounding environment based on a specifying result of the direction.

The robot device may further include an interaction processing unit that confirms establishment of interaction performed on establishment of joint attention with the user.

The interaction processing unit may confirm establishment of the interaction after the order is acquired.

The interaction processing unit may confirm establishment of the interaction before the order is acquired.

The position/posture estimation unit may estimate the position and posture of the optical indication device by recognizing the optical indication device gripped by the user.

According to an embodiment of the present invention, there is provide a method of controlling a robot device, including the steps of acquiring an order for encouraging establishment of joint attention with a robot device on a target from a user, estimating a position and posture of an optical indication device, which is operated by the user to indicate the target by irradiation of a beam, in response to acquisition of the order, and specifying a direction of the target indicated by irradiation of the beam based on an estimation result of the position and posture and specifying the target on an environment map representing a surrounding environment based on a specifying result of the direction.

According to another embodiment of the present invention, there is provided a program for causing a computer to execute the method of controlling the robot device. Here, the program may be provided by using a computer-readable recording medium and may be provided via communication means.

As described above, according to the present invention, it is possible to provide a robot device, a method of controlling the robot device, and a program in which establishment of joint attention on a target between the user and the robot can be supported.

BRIEF DESCRIPTION OF THE DRAWINGS

FIG. 9 is a flowchart illustrating a procedure of another control method of a robot.

DETAILED DESCRIPTION OF THE EMBODIMENT(S)

Figure 1:
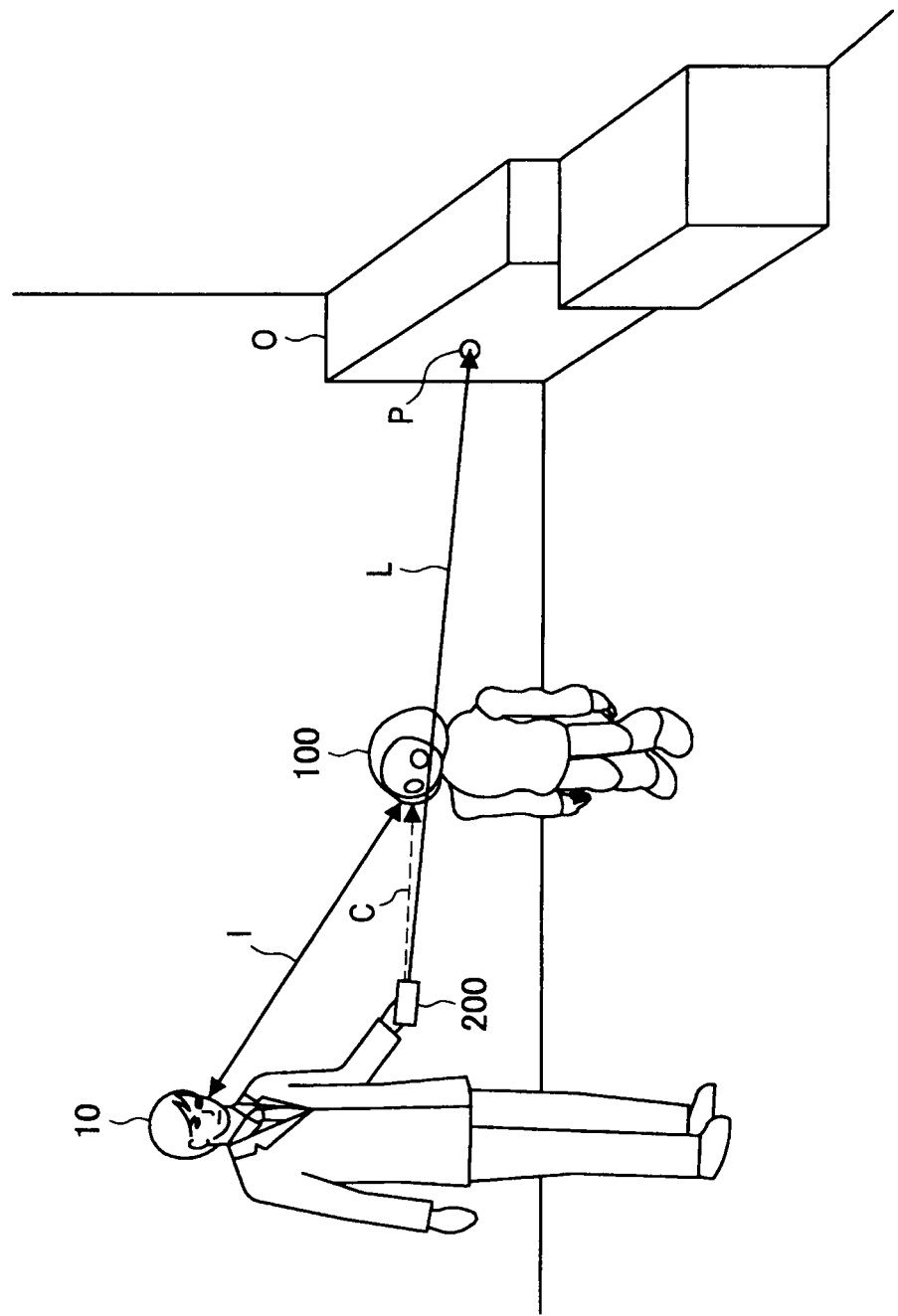
FIG. 1 is a diagram illustrating a configuration of a robot system according to an exemplary embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

In this disclosure, exemplary embodiments of the present invention will be described according to the following items:
1. A configuration of a robot system
2. A configuration of a robot
3. A configuration of a pointer
4. A control method of a robot
5. An example of interaction
6. Summary.

1. A CONFIGURATION OF A ROBOT SYSTEM

First, a configuration of a robot system according to an exemplary embodiment of the present invention will be described with reference to FIG. 1. FIG. 1 illustrates a configuration of a robot system.

As illustrated in FIG. 1, in the robot system, establishment of joint attention on a target O between a user 10 and a robot device 100 (hereinafter, also referred to as a "robot 100") is supported using a pointer 200 (an optical indication device) such as a laser pointer.

For example, the robot 100 is a two-legged robot that supports human activities in various scenes in daily life. The robot 100 can act corresponding to an internal state (happiness, anger, sorrow, pleasure, etc.) and express a basic action done by a human being.

Figure 3:
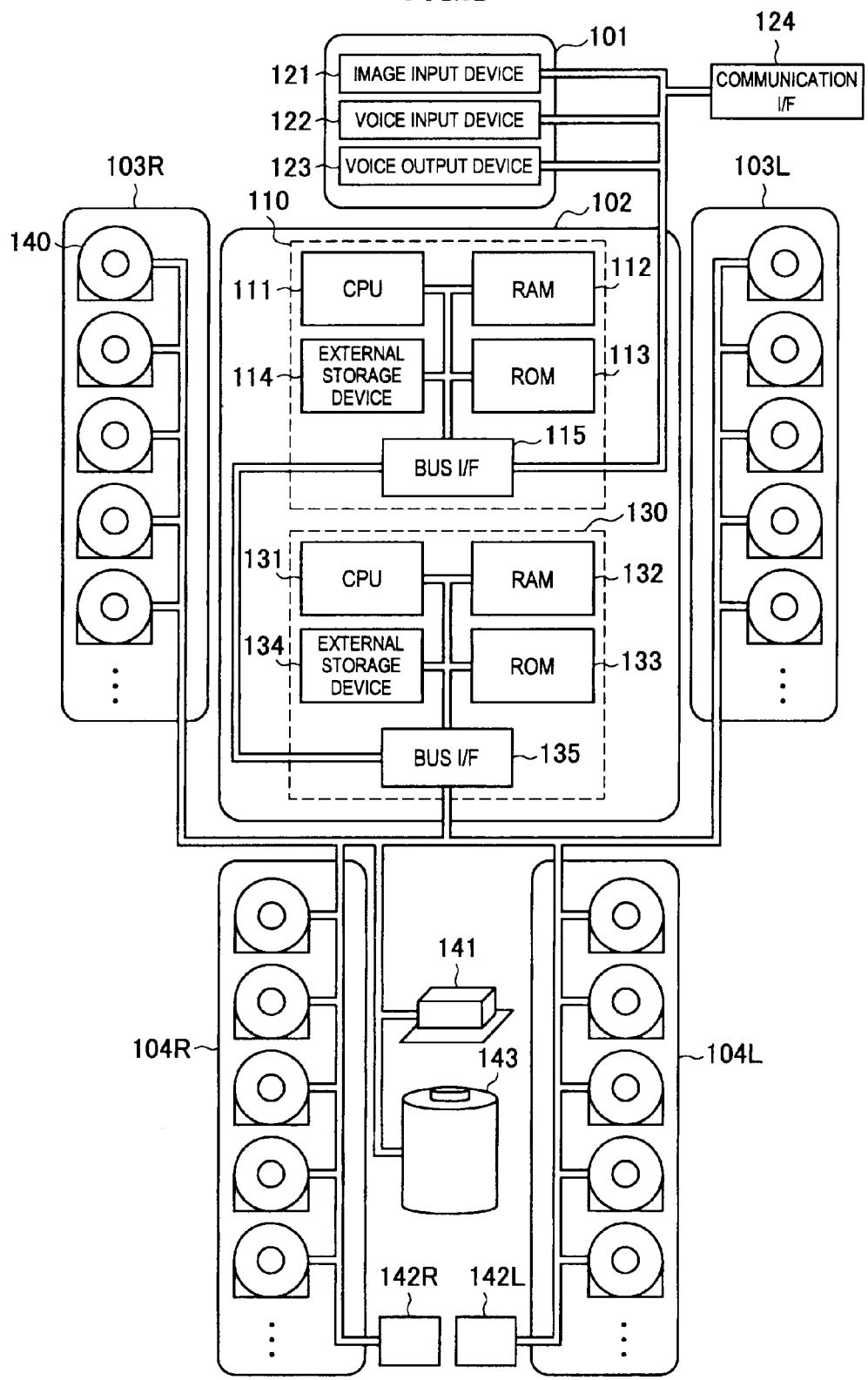
FIG. 3 is a block diagram illustrating a configuration of a control system of a robot.

The robot 100 includes an image input device 121, a voice input device 122, and a voice output device 123 which are built therein as illustrated in FIG. 3. The robot 100 receives surrounding image data through the image input device 121, receives voice data through the voice input device 122, and outputs voice data through the voice output device 123. Further, the robot 100 further includes a communication interface (I/F) 124 built therein as illustrated in FIG. 3. Thus, the robot 100 receives an order command C output from the pointer 200 or the like in response to the user's operation and transmits a response to the pointer 200 or the like.

The pointer 200 is used to indicate the target O by irradiation of a beam L with high directivity. The pointer 200 preferably has sufficient light intensity for the user 10 to view a bright point P of the beam L irradiated to the target O, which needs not be detectable by the robot 100. The light of the pointer 200 is not used for the robot 100 to recognize the target O in which joint attention is to be established, but rather for the user 10 to confirm the target O.

If the user 10 desires to establish joint attention on the target O with the robot 100, the user 10 gives an order (a joint attention order) command C for encouraging establishment of joint attention to the robot 100 and operates the pointer 200 to indicate the target O by irradiating the beam L. The robot 100 acquires the order command C and estimates the position and posture of the pointer 200 operated by the user 10 in response to the order command C. The robot 100 specifies a direction of the target O (an indication direction) indicated by irradiation of the beam L based on the estimation result of the position and posture and specifies the target O on an environment map EM representing a surrounding environment based on the estimation result of the indication direction.

Here, establishment of interaction I, which is made with regard to establishment of joint attention based on a recognition result of an image or a voice or a detection result of the order command C, may be confirmed between the user 10 and the robot 100.

2. A CONFIGURATION OF THE ROBOT 100

Figure 2:
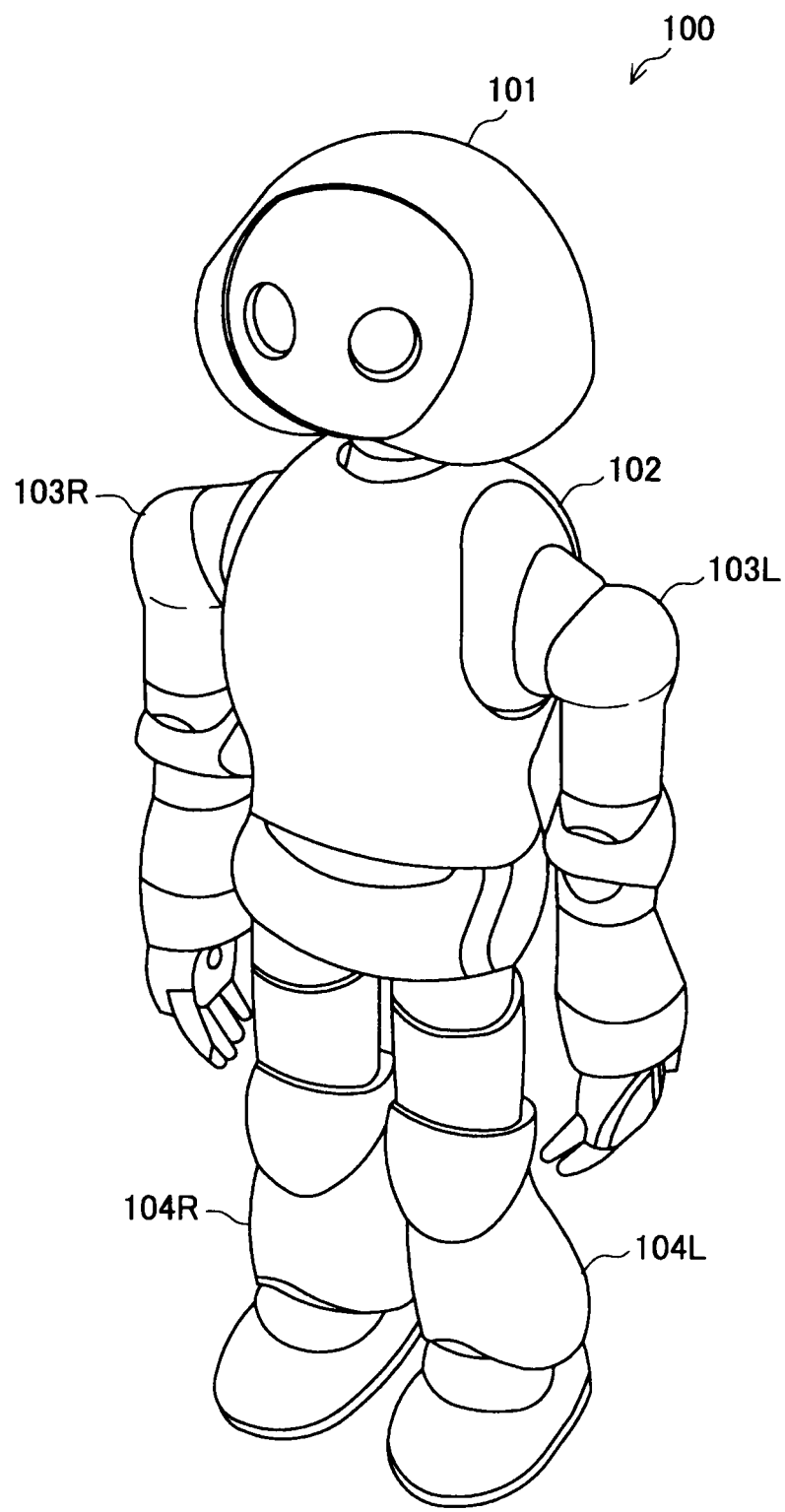
FIG. 2 is a perspective view illustrating an appearance of a robot.
Figure 4:
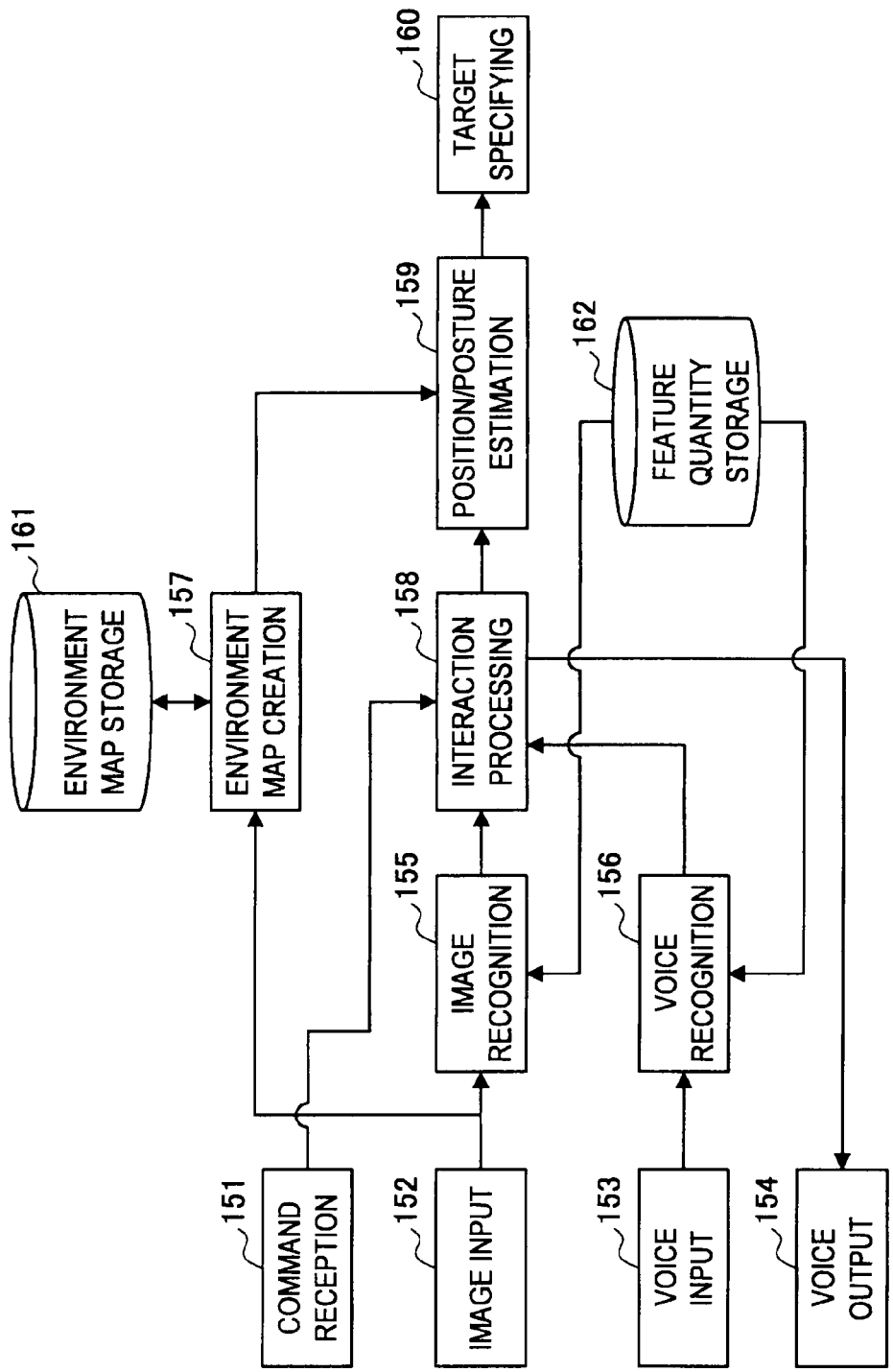
FIG. 4 is a block diagram illustrating a major functional configuration of a robot.

Next, the robot 100 according to an exemplary embodiment of the present invention will be described with reference to FIGS. 2 to 4. FIG. 2 illustrates an appearance of the robot 100, and FIG. 3 illustrates a configuration of a control system of the robot 100. FIG. 4 illustrates a major functional configuration of the robot 100.

As illustrated in FIG. 2, the robot 100 is constituted such that a head section 101, a pair of right and left arm sections 103L and 103R, and a pair of right and left leg sections 104L and 104R are coupled to predetermined positions of the body trunk unit 102, respectively.

As illustrated in FIG. 3, the robot 100 includes a control system disposed, for example, in the body trunk unit 102. The control system includes a thought control module 110 that deals with an emotional judgment or the expression of feelings in response to the user's input actively and a motion control module 130 that controls whole-body cooperative motion of the robot 100 such as driving of an actuator 140.

The thought control module 110 includes a central processing unit (CPU) 111 that executes arithmetic processing related to the emotional judgment or the expression of feelings, a random access memory (RAM) 112, a read only memory (ROM) 113, an external storage device 114, and the like. The thought control module 110 decides a current feeling or thought of the robot 100 in response to a stimulus from the outside world such as the image data input from the image input device 121, the voice data input from the voice input device 122, and the order command C input from the communication I/F 124. The thought control module 110 transfers the order to the motion control module 130 to execute an action or a behavior that is based on decision-making.

The motion control module 130 includes a CPU 131 that controls whole-body cooperative motion of the robot 100, a RAM 132, a ROM 133, an external storage device 134, and the like. For example, a walking pattern calculated off line, a target zero moment point (ZMP) orbit, and other action patterns are accumulated in the external storage device 134.

Various kinds of devices such as the actuator 140, a distance measurement sensor (not shown), a posture sensor 141, ground confirmation sensors 142L and 142R, a load sensor (not shown), and a power control device 143 are connected to the motion control module 130 through a bus interface (I/F) 135. The actuator 140 implements movement of joints of the robot 100. The distance measurement sensor measures the distance between the user 10 and the target O. The posture sensor 141 is used to measure the posture or gradient of the body trunk unit 102. The ground confirmation sensors 142L and 142R detect the soles of the right and left feet departing from the floor or landing on the floor, respectively. The load sensor detects a load that acts on the soles of the right and left feet. The power control device 143 is used to manage power, for example, battery power.

The thought control module 110 and the motion control module 130 are constructed on a common platform and are connected with each other through the bus I/Fs 115 and 135.

The motion control module 130 controls the whole-body cooperative motion through each actuator 140 so that a behavior instructed from the thought control module 110 can be implemented. That is, the CPU 131 reads out an action pattern corresponding to a behavior instructed from the thought control module 110 from the external storage device 134 or generates an action pattern internally. The CPU 131 sets motion of the foot, a ZMP orbit, motion of the body trunk, motion of the upper limb, and the horizontal position or height of the lumbar part according to the instructed action pattern. The CPU 131 transfers orders for instructing actions according to the set content to each actuator 140.

Further, by detecting the posture or gradient of the body trunk unit 102 of the robot 100 based on an output signal of the posture sensor 141 and detecting in which state of a standing leg or an idling leg each of the leg sections 104L and 104R is based on an output signal from each of the ground confirmation sensors 142L and 142R, the CPU 131 adaptively controls the whole-body cooperative motion of the robot 100. Further, the CPU 131 controls the posture or motion of the robot 100 so that the ZMP position can be directed to the center of a ZMP stable region.

Further, the motion control module 130 provides feedback on to what degree an intended behavior decided by the thought control module 110 has been implemented, that is, a processing status, back to the thought control module 110. As described above, the robot 100 can autonomously act by judging its own status and a surrounding status based on a control program. Further, the robot 100 executes a control method for supporting establishment of joint attention, which will be described later, based on a control program.

As illustrated in FIG. 4, the robot 100 includes a variety of functional configurations for establishing joint attention on the target O with the user 10. A major functional configuration of the robot 100 includes a command reception unit 151, an image input unit 152, a voice input unit 153, a voice output unit 154, an image recognition unit 155, a voice recognition unit 156, an environment map creation unit 157, an interaction processing unit 158, a position/posture estimation unit 159, a target specifying unit 160, an environment map storage unit 161, and a feature quantity storage unit 162.

Further, the command reception unit 151, the image input unit 152, the voice input unit 153, and the voice output unit 154 correspond to the communication I/F 124, the image input unit 121, the voice input unit 122, and the voice output unit 123, respectively as shown in FIG. 3. The other functional configurations are implemented, for example, by the CPU 111, the RAM 112, the external storage device 114, and the like of the thought control module 110.

The command reception unit 151 receives the order command C including the joint attention order from the pointer 200 in response to an operation on the pointer 200 in a wired or wireless manner. The command reception unit 151 includes, for example, one or more receiving devices (not shown) disposed in the head section 101. If the order command C is a radio signal, a plurality of receiving devices are disposed in different directions, and a rough direction in which the user 10 is positioned may be estimated based on a difference of a received signal intensity between the receiving devices. The command reception unit 151 functions as an instruction acquisition unit.

The image input unit 152 receives an image around the robot 100 as image data and supplies the image data to the image recognition unit 155 and the environment map creation unit 157. The image data includes data representing the user 10 or an object positioned around the robot 100 and data representing the position and posture of the pointer 200. Further, the image data includes data representing the user's expression or gesture used to confirm establishment of the interaction I.

The voice input unit 153 receives a voice around the robot 100 as voice data and supplies the voice data to the voice recognition unit 156. The voice data includes data of a voice uttered by the user 10 or the object positioned around the robot 100. Further, the voice data includes data representing a voice order from the user 10 used to confirm establishment of the interaction I.

The voice output unit 154 outputs a voice to the outside in response to predetermined voice data. The voice data includes data representing a voice response used to confirm establishment of the interaction I. Further, the voice response is generated based on data stored in the external storage device 114 or the like.

The image recognition unit 155 recognizes the user 10 or the object positioned around the robot 100, the position and posture of the pointer 200, and the user's expression or gesture based on a feature quantity included in the image data. Further, the feature quantities of the user 10 or the object, the pointer 200, the user's expression or gesture, and the like are previously stored in the feature quantity storage unit 162.

The voice recognition unit 156 recognizes the voice uttered by the user 100 or the object positioned around the robot 100 and the voice order from the user 100 based on a feature quantity included in the voice data. Further, the feature quantity of the voice order is also previously stored in the feature quantity storage unit 162.

The environment map creation unit 157 recognizes an environment of an object, a step difference, or the like through a plurality of planes extracted from distance information obtained by a stereo vision or the like to create the environment map EM and stores the environment map EM in the environment map storage unit 161. The environment map creation unit 157 updates the environment map EM and supplies the environment map EM to the position/posture estimation unit 159. The stereo vision is obtained by subjecting images, which are input from two cameras (not shown) that constitute the image input unit 152, to stereo image processing.

The environment map creation unit 157 obverses the outside world through a stereo vision system and outputs stereo data that is three-dimensional distance information calculated by a parallax image of a stereoscopic camera as an image. That is, image inputs from two left and right cameras corresponding to both eyes of a human being are compared near each pixel, the distance to the target O from the parallax is estimated, and three-dimensional distance information is output as the image.

The environment map creation unit 157 recognizes a plurality of planes present inside the environment by detecting a plane from stereo data through a plane detector (not shown). Further, the environment map creation unit 157 creates the environment map EM in which the surrounding environment acquired from plane data by the stereo vision system is divided in a horizontal direction or a vertical direction in the form of a grid of a predetermined size. The environment map creation unit 157 further updates the environment map EM based on the stereo data and plane data and creates the environment map EM by referring to an obstacle presence possibility of a three-dimensional grid.

The interaction processing unit 158 confirms establishment of the interaction I made with regard to establishment of joint attention with the user based on the recognition result of the image or the voice or the detection result of the order command C. Further, the details of an interaction process will be described later. The interaction processing unit 158 functions as an interaction processing unit in cooperation with the image recognition unit 155, the voice recognition unit 156, and the like.

The position/posture estimation unit 159 estimates the position and posture of the pointer 200 operated by the user 10 and supplies the estimation result to the target specifying unit 160. Based on the estimation result of the position and posture of the pointer 200, the target specifying unit 160 specifies a direction of the target O indicated by the pointer 200 and specifies the target O on the environment map EM. Further, the details of a process of estimating the position and posture of the pointer 200 and a process of specifying the target O will be described later.

3. A CONFIGURATION OF THE POINTER 200

Figure 5:
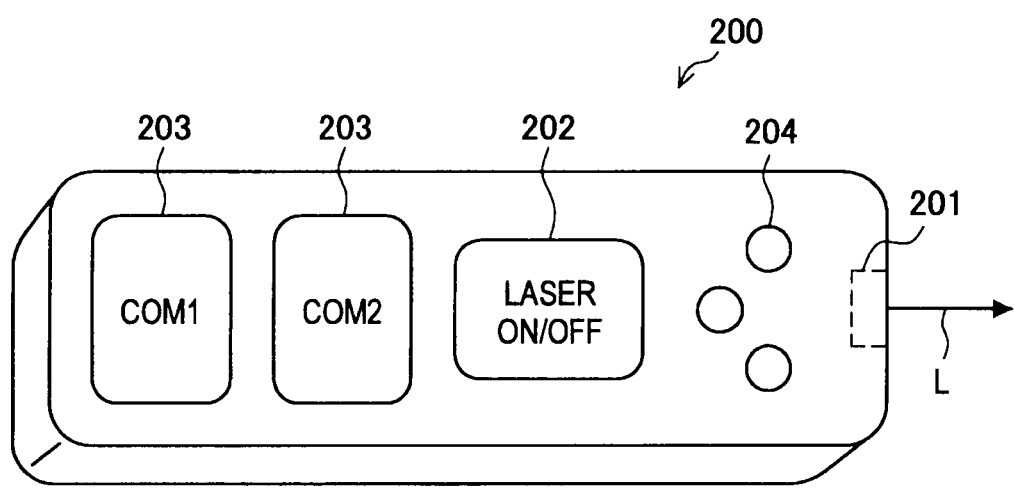
FIG. 5 is a perspective view illustrating an appearance of a pointer.

Next, the pointer 200 according to an exemplary embodiment of the present invention will be described with reference to FIGS. 5 and 6. FIG. 5 illustrates an appearance of the pointer 200, and FIG. 6 illustrates a major function configuration of the pointer 200.

As illustrated in FIG. 5, the pointer 200 is an optical indication device such as a laser pointer that indicates the target O by irradiation of the beam L. The pointer 200 includes an irradiation hole 201 which is disposed a front end thereof and through which the beam L such as laser light is irradiated, a beam irradiation change-over switch 202, an order command C operation switch 203, a lighting device 204 such as a light emitting device. The pointer 200 has a size that is grippable by the user 10. In FIG. 5, the pointer 200 has a flat rectangular shape but may have any other shape.

Figure 6:
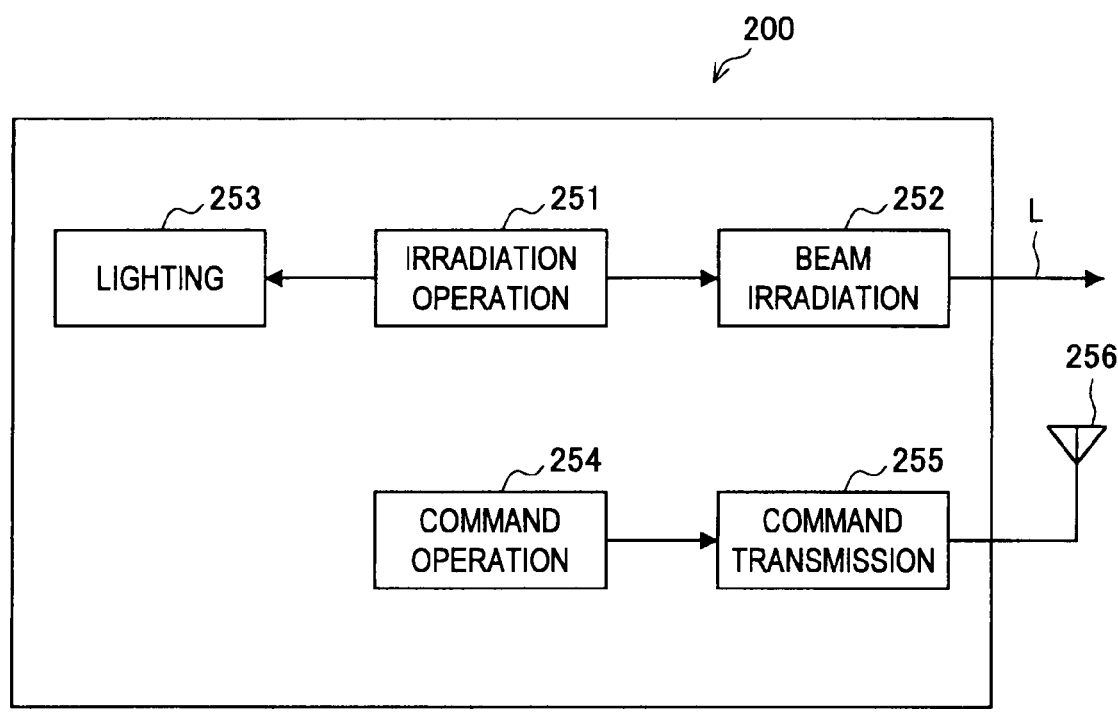
FIG. 6 is a block diagram illustrating a major functional configuration of a pointer.

As illustrated in FIG. 6, the pointer 200 includes an irradiation operation unit 251, a beam irradiation unit 252, a lighting unit 253, a command operation unit 254, a command transmission unit 255, and an antenna 256.

The irradiation operation unit 251 is an operation unit such as the change-over switch 202 and switches ON/OFF of beam irradiation in response to the user's operation. The beam irradiation unit 252 irradiates the beam L in a certain direction from the irradiation hole 201 of the pointer 200 when beam irradiation is in an ON state. The lighting unit 253 is a light emitting device such as a light emitting diode (LED) and lights up when beam irradiation is in an on state. The lighting unit 253 may be configured to light up according to a predetermined blinking pattern. The lighting unit 253 may be disposed in the center of the pointer 200 or may be dispersedly disposed in each end section The command operation unit 254 is an operation unit such as the operation switch 203 and transmits a predetermined order command C to the robot 100 in response to the user's operation. The order command C includes an order command C for encouraging establishment of joint attention or an order command C used for confirming establishment of the interaction I. The command transmission unit 255 transmits the order command C corresponding to a command input to the robot 100 through the antenna 256. Hereinafter, it is assumed that the order command C is transmitted in a radio manner, but the order command C may be transmitted in a wired manner.

The user 10 turns on beam irradiation while turning the irradiation hole 201 of the pointer 200 in a direction of the target O for which joint attention is established. The pointer 200 irradiates the beam L to the target O and indicates the target O through the bright point P of the beam L. Further, the pointer 200 lights up according to a predetermined blinking pattern or the like.

Here, the beam L preferably has the light intensity in which the bright point P of the beam L is visible by the user 10, and need not be detected by the robot 100. Meanwhile, the light emitting diode preferably has the light intensity in which the predetermined blinking pattern can be detected by the robot 100. The beam L is used for the user 10 to confirm the target O for which joint attention is established, and the light emitting device is used for the robot 100 to estimate the position and posture of the pointer 200.

Further, the lighting unit 253 is disposed to improve a degree of accuracy of estimation of the spatial position and posture of the pointer 200. For this reason, in order to improve the degree of accuracy of estimation, instead of the lighting unit 253 or together with the lighting unit 253, the point 200 may be configured to have a characteristic shape, pattern, or color. Alternatively, random dot patterns may be formed on the entire pointer 200. Here, by detecting features of three or more points dispersed in various positions of the pointer 200, the spatial position and posture of the pointer 200 can be estimated.

4. A CONTROL METHOD OF THE ROBOT 100

Figure 7:
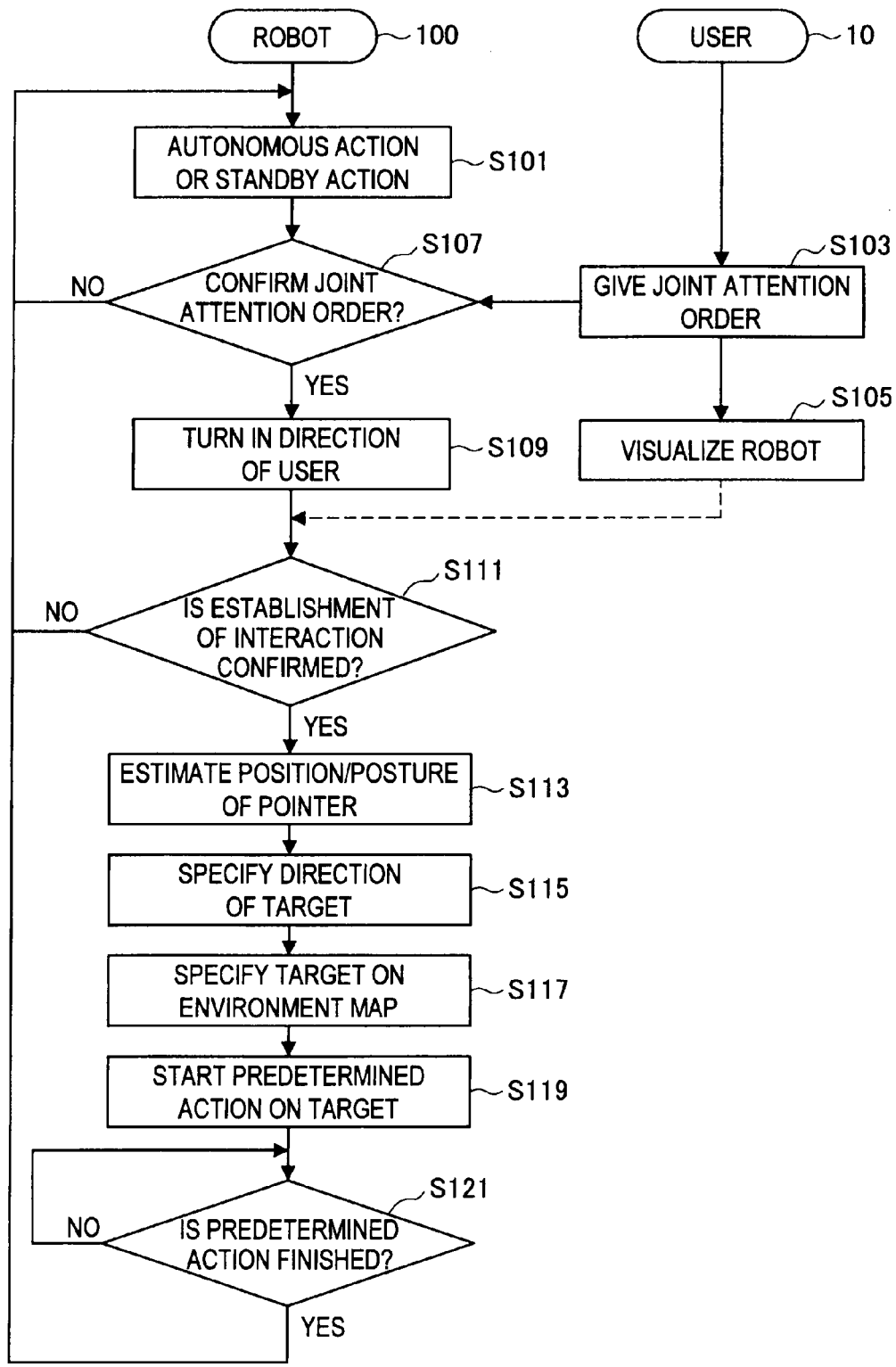
FIG. 7 is a flowchart illustrating a procedure of a control method of a robot.

Next, a procedure of a first control method of the robot 100 will be described with reference to FIG. 7 and FIGS. 8A to 8F. FIG. 7 illustrates the procedure of the first control method of the robot 100, and FIGS. 8A to 8F illustrate the control method illustrated in FIG. 7.

As illustrated in FIG. 7, the robot 100 performs an autonomous action or a standby action under control of the thought control module 110 and the motion control module 130 (step S101). The autonomous action refers to an action performed autonomously in response to a surrounding external state or an internal state of the robot 100. The standby action refers to an action for waiting for an order from the user 10.

Figure 8A:
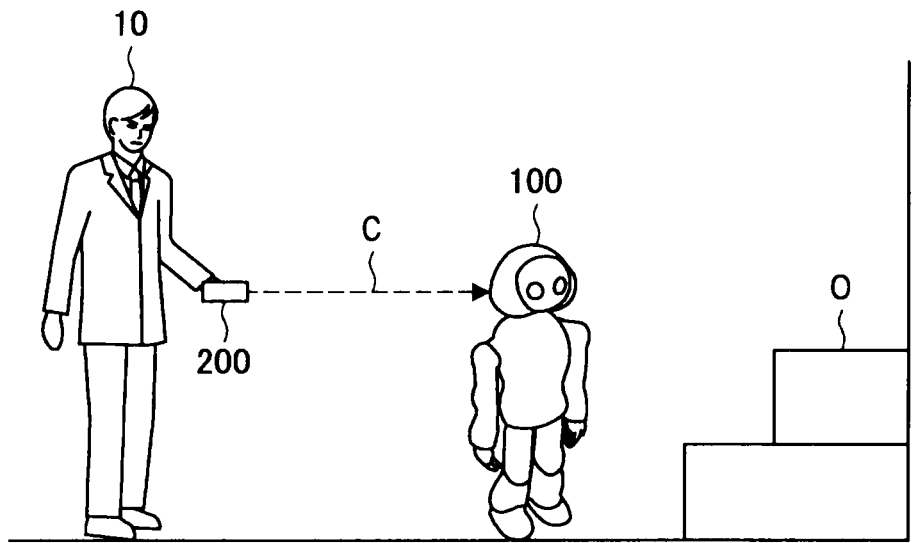
FIG. 8A is a diagram (1/6) for explaining the control method illustrated in FIG. 7.

As illustrated in FIG. 8A, the user 10 gives the joint attention order for encouraging establishment of joint attention to the robot 100 and visualizes the robot 100 (step S103 and step S105). Further, the action for giving the joint attention order (step S103) and the action for visualizing the robot 100 (step S105) may be performed in reverse order or in parallel.

The joint attention order is performed by a predetermined operation on the pointer 200. In this case, the order command C representing the joint attention order is transmitted from the pointer 200 to the robot 100 in response to the predetermined operation. Further, the joint attention order may be performed, for example, by a predetermined operation on an operation input device other than the pointer 200 or a predetermined voice order on the voice input unit 153. Further, the joint attention order may be performed at the same time as indication of the target O which will be described later.

Figure 8B:
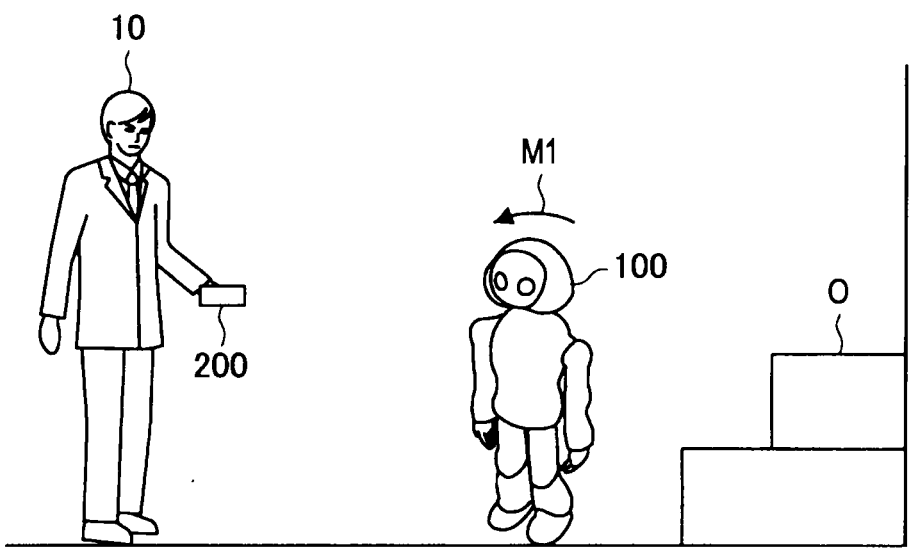
FIG. 8B is a diagram (2/6) for explaining the control method illustrated in FIG. 7.

Meanwhile, the robot 100 confirms whether or not the joint attention order is present based on a reception status of the order command C by the command reception unit 151 during the autonomous action or the standby action (step S107). Then, when the joint attention order is confirmed, as illustrated in FIG. 8B, the robot 100 turns in a direction of the user 10 by an action M1 (step S109).

Specifically, the robot 100 adjusts a shooting direction (for example, face portion) the input unit 152 to a direction of the user 10, particularly, a direction capable of detecting the pointer 200 operated by the user's operation. As a result, the robot 100 turns in the direction of the user 10, a sense of interaction is expressed, and subsequent establishment of joint attention can be performed in a natural status.

The shooting direction is specified by detecting the feature quantity of the user 10 or the pointer 200 from the image data input to the image input unit 152 and recognizing the user 10 or the pointer 200. The shooting direction is adjusted by rotating the whole body of the robot 100 or only the head section 101 through the motion control module 130. Further, the feature quantity of the user 10 or the pointer 200 may be detected while rotating the position of the whole body of the robot 100 or the head section 101.

Figure 8C:
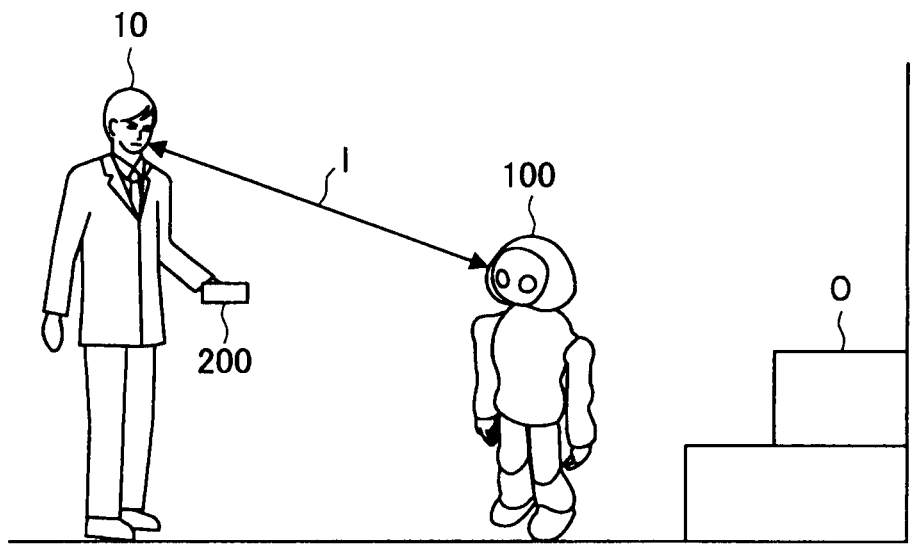
FIG. 8C is a diagram (3/6) for explaining the control method illustrated in FIG. 7.

If the user 10 and the robot 100 face each other, as illustrated in FIG. 8C, the robot 100 confirms whether or not establishment of the interaction I is present (step S111). Establishment of the interaction I will be described in detail later, but is confirmed based on the recognition result of the image or the voice or the detection result of the order command C. The robot 100 performs a subsequent process (step S113) when establishment of the interaction I is confirmed within a predetermined time, but returns to the autonomous action or the standby action (step S101) when establishment of the interaction I is not confirmed within a predetermined time.

Here, since the user 10 and the robot 100 face each other, the robot 100 can confirm that the joint attention order has been given by confirming establishment of the interaction I. For this reason, compared to a case in which there is no confirmation for establishment of the interaction I is, an erroneous action caused by error detection of the joint attention order can be prevented.

Figure 8D:
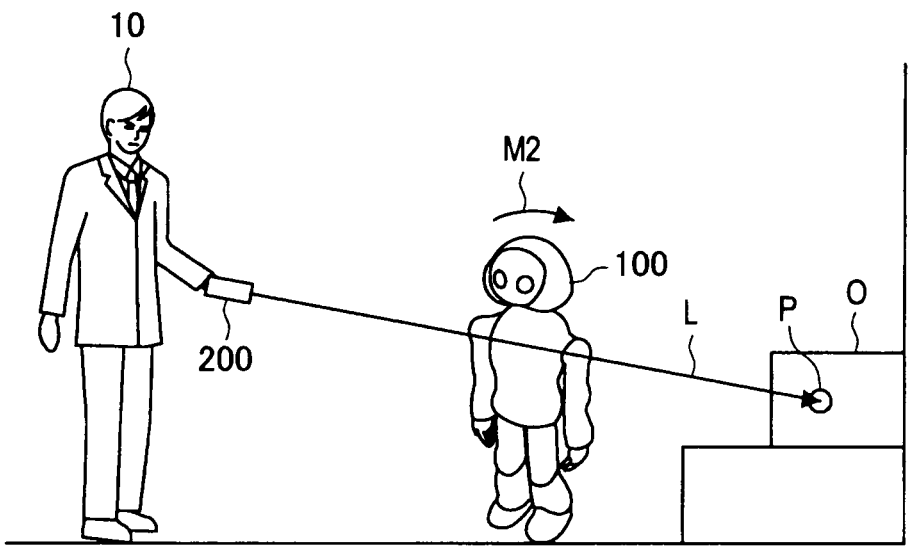
FIG. 8D is a diagram (4/6) for explaining the control method illustrated in FIG. 7.

The robot 100 estimates the position and posture of the pointer 200 operated by the user 10 (step S113). Here, it is assumed that at a point in time when the position and posture of the pointer 200 are estimated, as illustrated in FIG. 8D, the user 10 operates the pointer 200 to irradiate the beam L and indicates the target O.

The target O may be indicated as a point represented by the bright point P of the stopped beam L or as an area represented by the bright point P of the beam L that moves in a predetermined range. In the former case, the point represented by the bright point P is specified as the target O, and in the latter case, the range represented by the bright point P is specified as the target O. The user 10 can confirm the indicated target O by visualizing the bright point P of the beam L. The robot 100 specifies the target O based on the position and posture of the pointer 200 other than the bright point P of the beam L.

The position and posture of the pointer 200 are estimated by detecting the feature quantity of the pointer 200 from the image data input to the image input unit 152. Particularly, the position and posture of the pointer 200 may be estimated with a high degree of accuracy by detecting the lighting status of the light emitting device disposed in the pointer 200, and the shape, the color, or the pattern of the pointer 200 as the feature quantity. Here, it is assumed that the feature quantity of the pointer 200 is previously stored in the feature quantity storage unit 162 or the like.

Further, the position and posture of the pointer 200 may be estimated using an object recognition technique proposed by the applicant in Japanese Patent Application Laid-Open (JP-A) No. 2004-326693 or a technique such as stereo recognition or Hough transform. Further, the position and posture of the pointer 200 may be estimated using detection data of an acceleration sensor or a magnetic sensor (not shown) disposed in the pointer 200 instead of the image data or together with the image data.

Particularly, when the robot 100 is near the user 10, although the target O in which joint attention is established is positioned in the distance, the position and posture of the pointer 200 may be estimated with a high degree of accuracy and thus the target O can be specified with a high degree of accuracy. Further, when the robot 100 is near the user 10, since the position and posture of the pointer 200 may be estimated with a high degree of accuracy, the user 10 can easily perform a means for improving a degree of accuracy of estimation in response to a request from the robot 100 or voluntarily. For example, the user 10 can change the posture of the pointer 200 so that the pointer 200 can be easily recognized in a state in which a direction of the target O is indicated.

When the position and posture of the pointer 200 are estimated, the robot 100 specifies a direction of the target O (the indication direction) indicated by irradiation of the beam L based on the estimation result (step S115). That is, the indication direction is specified based on recognition of the position and posture of the pointer 200 other than recognition of the bright point P of the beam L irradiated to the target O. The indication direction is specified by estimating the position and direction of the irradiation hole 201 based on the position and posture of the pointer 200. Further, the position and direction of the irradiation hole 201 on the pointer 200 are set as information previously known to the robot 100.

When the direction of the target O is specified, the robot 100 specifies the target O on the environment map EM based on the specifying result of the indication direction (step S117). The target O is specified, for example, as a specific object or position by specifying the position and posture of the pointer 200 on the environment map EM and further checking the indication direction and data on the environment map EM.

Figure 8E:
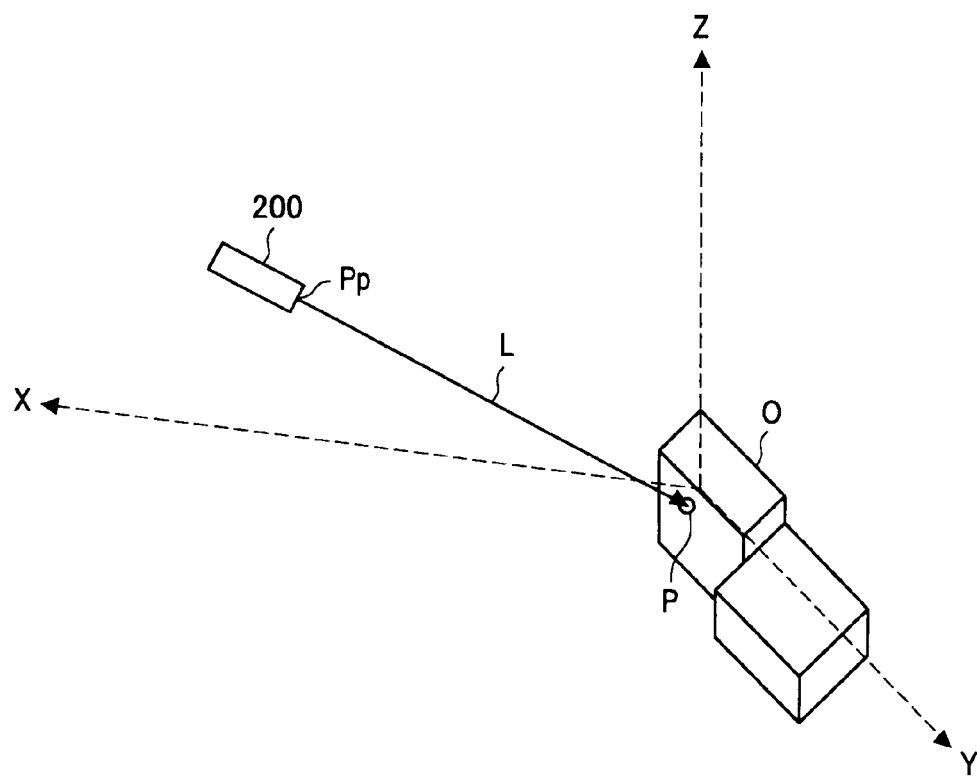
FIG. 8E is a diagram (5/6) for explaining the control method illustrated in FIG. 7.

FIG. 8E illustrates the specifying result of the target O on the environment map EM. The target O is specified on the environment map EM using three-dimensional coordinates. The position and posture of the pointer 200 are estimated, for example, by detecting three or more feature quantities present in the pointer 200 from the image data. As a result, the position and posture of the pointer 200 are estimated using the three-dimensional coordinates on the environment map EM.

The indication direction is specified by estimating the position and direction of the irradiation hole 201 from the position and posture of the pointer 200. As a result, the position and direction of the irradiation hole 201 are estimated using the three-dimensional coordinates on the environment map EM. Further, the indication direction is specified as a parameter (three-dimensional angle information, etc.) that defines a straight line extending in a direction that the irradiation hole 201 faces starting from the position Pp of the irradiation hole 201 as a basic point. The target O is specified as the object or the position present on the straight line in the front side from the pointer 200 side on the environment map EM.

Figure 8F:
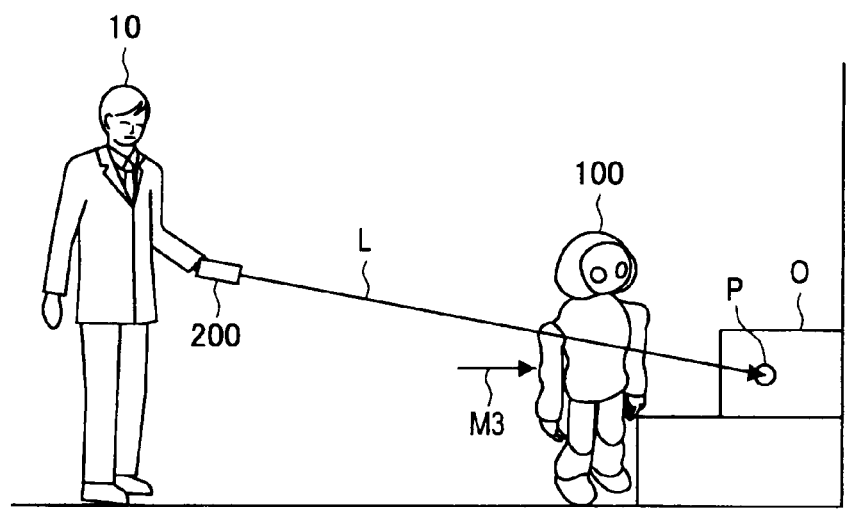
FIG. 8F is a diagram (6/6) for explaining the control method illustrated in FIG. 7.

When the target O is specified, as illustrated in FIG. 8F, the robot 100 starts a predetermined action on the specified target O (step S119). For example, the robot 100 turns in the direction of the target O by an action M2 illustrated in FIG. 8D and moves in the direction of the target O by an action M3 illustrated in FIG. 8F. Then, when the predetermined action is completed (step S121), the robot 100 returns to the autonomous action or the standby action (step S101).

As a result, establishment of joint attention on the target O between the user 10 and the robot 100 can be supported. Further, the process of confirming establishment of the interaction I (step S111), the process of estimating the position and posture of the pointer 200 (step S113), and the process of specifying the direction of the target O (step S115) may be performed in reverse order or in parallel. At this time, when establishment of the interaction I is confirmed after the position and posture of the pointer 200 are estimated, since estimation of the position and posture has been completed, establishment of joint attention can be supported with certainty.

Next, a second control method of the robot 100 will be described with reference to FIG. 9. Further, duplicate description with the first control method will be omitted.

The robot 100 performs the autonomous action or the standby action (step S151). When the user 10 visualizes the robot 100 (step S153), it is confirmed whether or not establishment of the interaction I is present (step S157). When the robot 100 turns in the direction of the user 10 (step S155), establishment of the interaction I is confirmed (Yes in step S157). Further, when the robot 100 turns in the direction of the user 10 (step S155), it is confirmed whether or not establishment of the interaction I is present (step S159). When the user 10 visualizes the robot 100 (step S153), establishment of the interaction I is confirmed (Yes in step S159).

If at least one of the robot 100 and the user 10 confirms establishment of the interaction I (step S157 and step S159), the robot 100 confirms whether or not the joint attention order is present (step S163). The robot 100 performs a subsequent process (step S165) when the joint attention order is confirmed but returns to the autonomous action or the standby action (step S151) when the joint attention order is not confirmed.

Then, when the joint attention order is confirmed, the robot 100 estimates the position and posture of the pointer 200 operated by the user 10 (step S165). Here, it is assumed that at a point in time when the position and posture of the pointer 200 are estimated, the user 10 operates the pointer 200 to irradiate the beam L and indicates the target O.

When the position and posture of the pointer 200 are estimated, the robot 100 specifies the direction of the target O (the indication direction) indicated by irradiation of the beam L based on the estimation result (step S167). When the direction of the target O is specified, the robot 100 specifies the target O on the environment map EM based on the specifying result of the indication direction (step S169).

Then, the robot 100 starts a predetermined action on the specified target O (step S171). When the predetermined action is completed (Yes in step S173), the robot 100 returns to the autonomous action or the standby action (step S151).

As a result, establishment of joint attention on the target O between the user 10 and the robot 100 can be supported. Further, the process of confirming establishment of the interaction I (step S159), the process of estimating the position and posture of the pointer 200 (step S165), and the process of specifying the direction of the target O (step S167) may be performed in reverse order or in parallel.

In the second control method, since the presence of the joint attention order is confirmed after establishment of the interaction I is confirmed, the joint attention order can be confirmed with a higher degree of certainty than in the first control method.

5. AN EXAMPLE OF THE INTERACTION I

Next, an example of the interaction I performed on establishment of joint attention between the user 10 and the robot 100 will be described with reference to FIGS. 10A to 10G. For example, the interaction I is performed using the recognition result of the image or the voice, the detection result of the order command C, and a combination thereof.

Figure 10A:
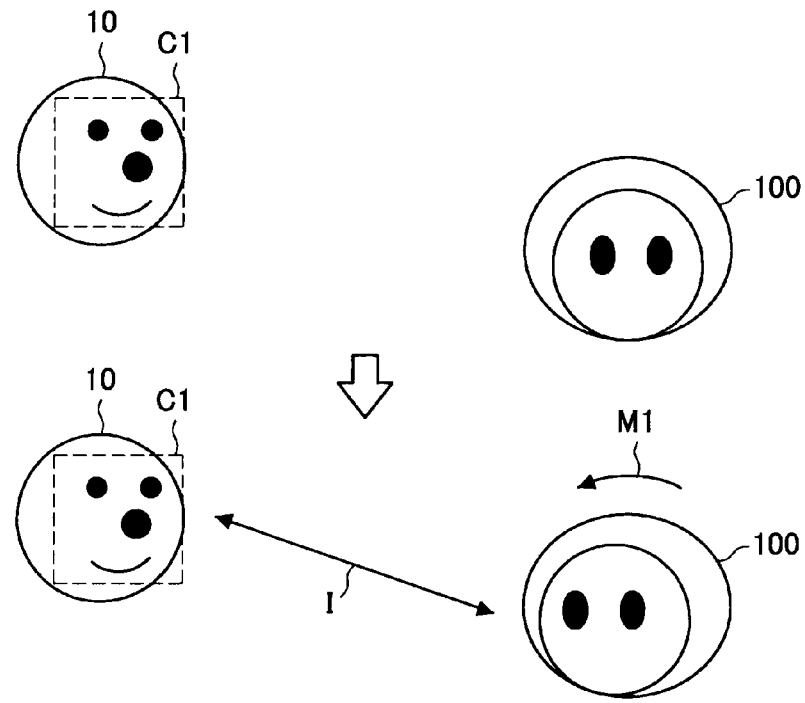
FIG. 10A is a diagram (1/7) for explaining interaction between a user and a robot.

In the case of using user face recognition, as illustrated in FIG. 10A, the robot 100 may detect the user's facial feature C1 from the image data of the image input unit 152 and recognize the facial feature C1 as the user's face. In this case, when the user's face is recognized, the robot 100 performs the action M1 for adjusting the shooting direction of the image input unit 152 to a direction of the user's face. The user 10 can confirm establishment of the interaction I by confirming the action M1. Further, the user's face may be recognized by detecting a feature of the front or the side of the user's face or may be recognized by detecting a feature of the user's whole body and then estimating the position of the face.

Figure 10B:
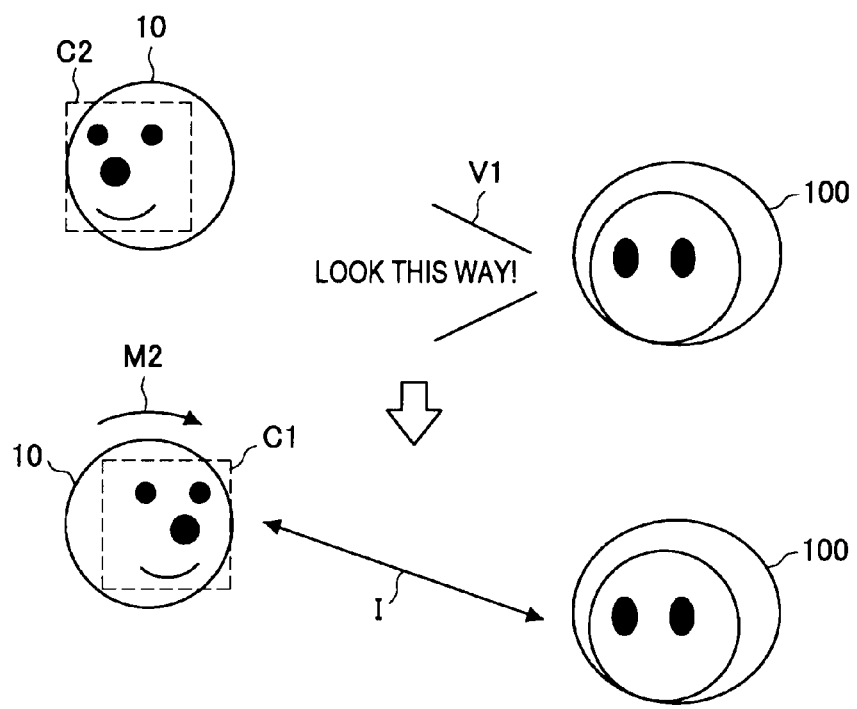
FIG. 10B is a diagram (2/7) for explaining interaction between a user and a robot.

Further, in order to ensure establishment of the interaction I, as illustrated in FIG. 10B, the robot 100 may detect the user's facial feature C2 from the image data and estimate a direction of the face or a direction of a sight line. Further, when the user's facial feature C1 is difficult to detect from the image data, the robot 100 may encourage the user 10 to turn his or her face toward itself using a visual or auditory means (for example, a voice V1 "look this way").

Further, in order to ensure establishment of the interaction I, the robot 100 may confirm establishment of the interaction I by detecting that the user 10 has performed a predetermined action in a state facing the user 10.

Figure 10C:
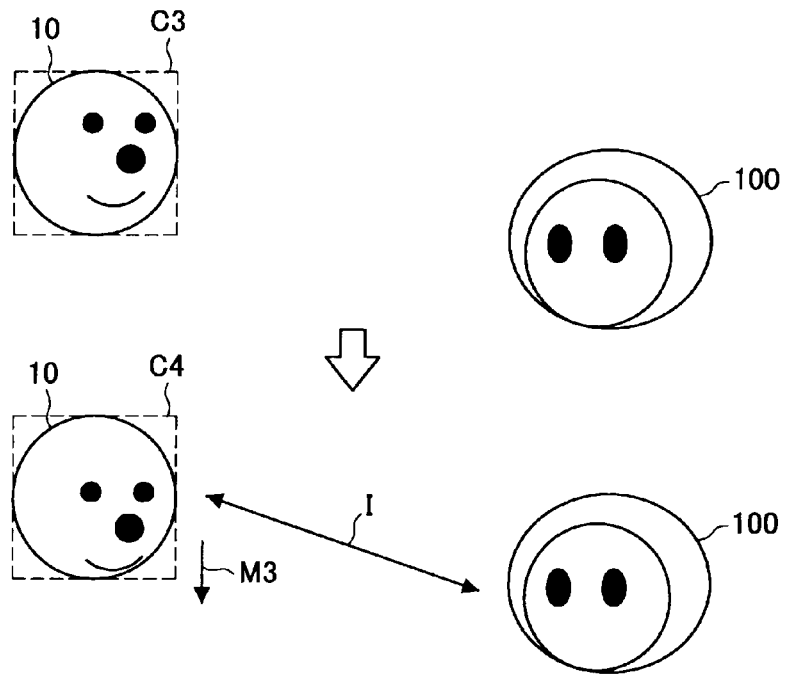
FIG. 10C is a diagram (3/7) for explaining interaction between a user and a robot.
Figure 10D:
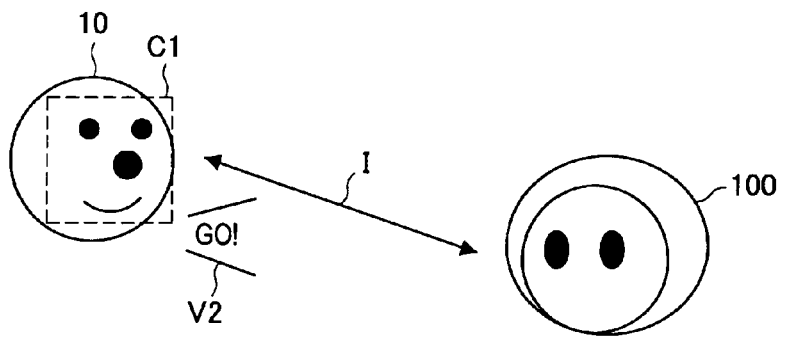
FIG. 10D is a diagram (4/7) for explaining interaction between a user and a robot.
Figure 10E:
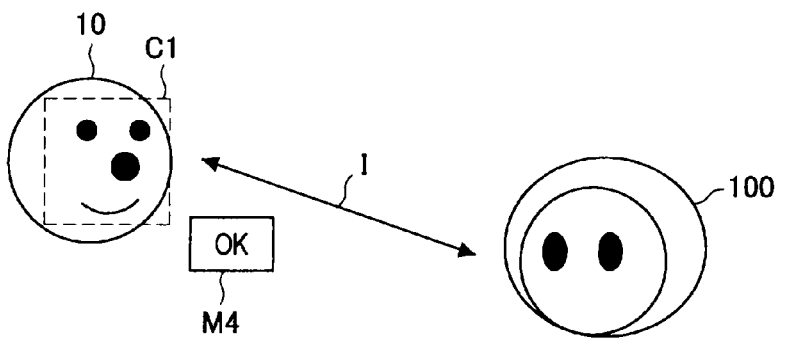
FIG. 10E is a diagram (5/7) for explaining interaction between a user and a robot.

For example, as illustrated in FIG. 10C, the robot 100 may detect the user's facial features C3 and C4 from the image data and detect the user's nod M3 or wink. Further, as illustrated in FIG. 10D, the robot 100 may detect an issue of a predetermined voice order (for example, a voice V2 "go" and "fetch") or a predetermined gesture (for example, an action "go" and "fetch"). Further, the robot 100 may detect a response "OK" from the user 10, as illustrated in FIG. 10E, after the robot 100 outputs a voice "I will get it" or detect that there is no response within a predetermined time (tacit consent).

Figure 10F:
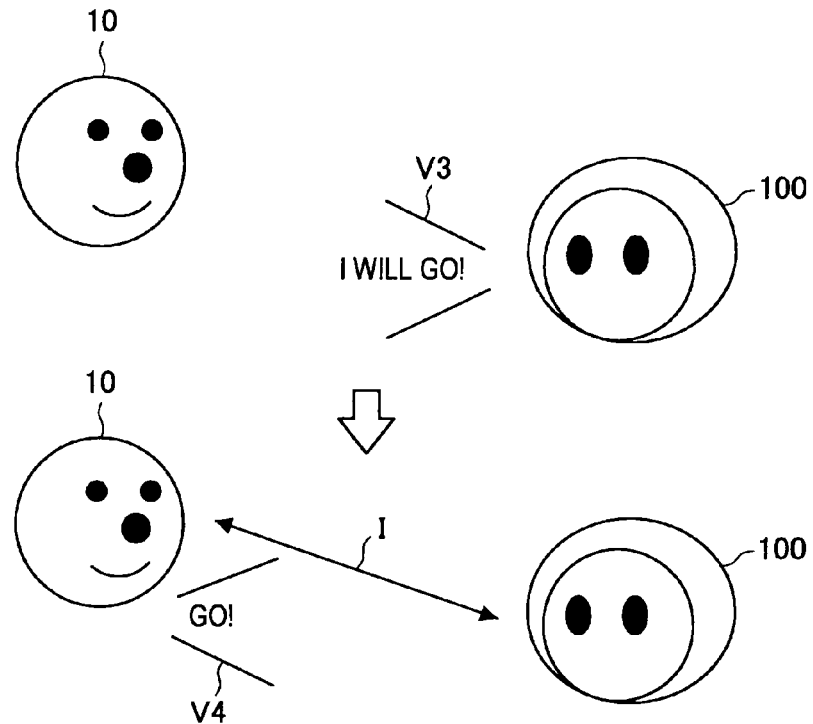
FIG. 10F is a diagram (6/7) for explaining interaction between a user and a robot.

In the case in which the user face recognition is not used, the robot 100 outputs a voice V3 "I will go" and "fetch" after specifying the target O as illustrated in FIG. 10F. The robot 100 confirms whether or not there is a response from the user 10 within a predetermined time. If a voice V4 "go" and "fetch" is confirmed within a predetermined time, the robot 100 may start a predetermined action on the specified target O. In this case, the robot 100 may detect a predetermined operation on the pointer 200 or a predetermined voice order as a response.

Figure 10G:
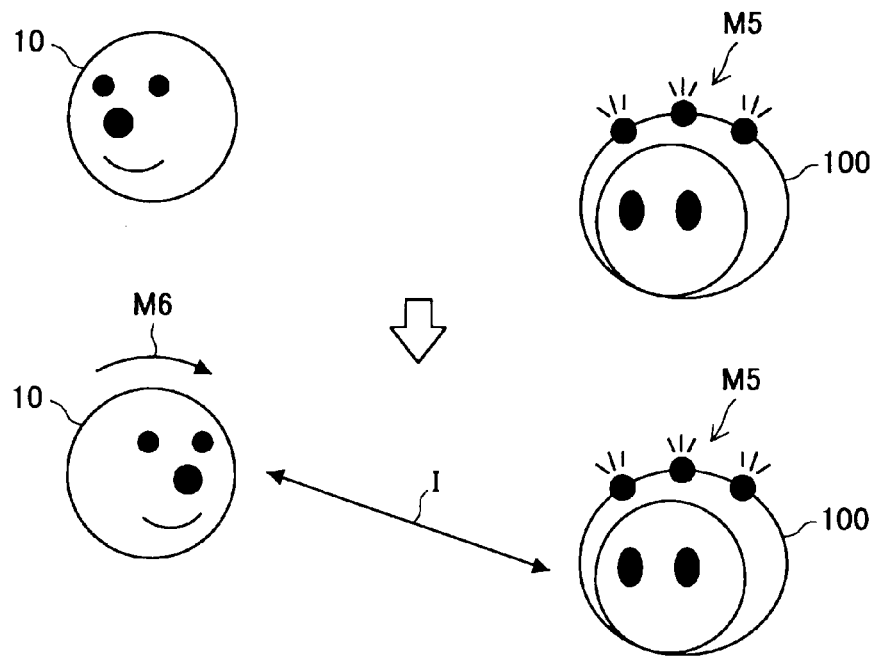
FIG. 10G is a diagram (7/7) for explaining interaction between a user and a robot.

Further, as illustrated in FIG. 10G the robot 100 may encourage the user 10 to perform an action M6 turning a sight line toward itself by lighting up M5 the light emitting device or the like disposed in a part of the body after specifying the target O. The robot 100 confirms whether or not there is a response from the user 10 within a predetermined time. If a response is confirmed, the robot 100 may start a predetermined action on the specified target O. In this case, the robot 100 may detect a predetermined operation on the pointer 200, a predetermined voice order, or the like as a response.

Further, in order to improve a degree of accuracy for specifying the target O, the processing result may be fed back from the robot 100 to the user 10, thereby changing an operation of the pointer 200 in response to the processing result by the robot 100.

For example, the robot 100 estimates the position and posture of the pointer 200, calculates an error accompanied with the estimation result, and transmits the error to the pointer 200. The pointer 200 judges that a degree of accuracy of estimation is sufficient when the estimation error is less than a threshold value but judges that the degree of accuracy of estimation is not sufficient when the estimation error is equal to or more than the threshold value. Further, a judgment on the degree of accuracy of estimation may be performed by the robot 100 instead of the pointer 200.

The pointer 200 changes an aspect of the beam L irradiated to the target O such as directivity or color according to the judgment result. For example, as the aspect of the beam L, as the degree of accuracy of estimation is higher, the directivity may be stronger, the color may be deeper, and/or the beam L may be continuously irradiated. However, as the degree of accuracy of estimation is lower, the directivity may be weaker, the color may be thinner, and/or the beam L may be intermittently irradiated.

The user 10 can confirm the error accompanied with the estimation result by visualizing an aspect of the beam L irradiated to the target O. When it is judged that the degree of accuracy of estimation is sufficient, the user 10 performs, for example, a response "OK." As a result, the robot 100 can specify the target O in a state in which the sufficient degree of accuracy of estimation is confirmed by the user 10.

However, when it is judged that the degree of accuracy of estimation is not sufficient, the user 10 adjusts, for example, the posture of the pointer 200 in a state in which the target O is indicated. At this time, when, for example, the posture of the pointer 200 is adjusted, the robot 100 estimates the position and posture of the pointer 200, and the pointer 200 changes an aspect of the beam L according to the judgment result. As a result, the robot 100 can improve the degree of accuracy for specifying the target O based on the feedback of the processing result.

6. SUMMARY

As described above, according to the control method of the robot 100 according to an exemplary embodiment of the present invention, since the target O is indicated by irradiation of the beam L using the pointer 200, the user 10 can confirm the indicated target O. Further, since the target O is specified by estimating the position and posture of the pointer 200, the robot 100 can specify the indicated target O without detecting irradiation of the beam L. Further, since the robot 100 turns in the direction of the user 10 in order to recognize the pointer 200 operated by the user 10, a sense of interaction can be expressed between the user 10 and the robot 100. As a result, establishment of joint attention can be supported between the user 10 and the robot 100 on the target O.

As described above, the exemplary embodiments of the present invention have been described hereinbefore in detail with reference to the accompanying drawings, but the present invention is not limited to the embodiments. A person having ordinary skill in the art would understand that various modifications or variations can be made within the scope of the technical spirit defined in the claims and included within the technical scope of the invention.

The present application contains subject matter related to that disclosed in Japanese Priority Patent Application JP 2010-82047 filed in the Japan Patent Office on Mar. 31, 2010, the entire content of which is hereby incorporated by reference.

What is claimed is:

1. A robot device, comprising:
circuitry configured to:
acquire an order for encouraging the robot device to establish joint attention on a target from a user;
estimate a position and a posture of an optical indication device, which is operated by the user to indicate the target by irradiation of a beam, in response to acquisition of the order; and
specify a direction of the target indicated by irradiation of the beam based on an estimation result of the position and posture and specifies the target on an environment map representing a surrounding environment based on a specifying result of the direction,
wherein the robot device does not detect the beam indicated by the optical indication device.

2. The robot device according to claim 1, wherein the circuitry is further configured to confirm establishment of interaction performed on establishment of joint attention with the user.

3. The robot device according to claim 2, wherein establishment of the interaction after the order is acquired is confirmed.

4. The robot device according to claim 2, wherein the circuitry is further configured to confirm establishment of the interaction before the order is acquired.

5. The robot device according to claim 1, wherein the circuitry is further configured to estimate the position and posture of the optical indication device by recognizing the optical indication device gripped by the user.

6. A method of controlling a robot device, comprising the steps of:
acquiring an order for encouraging establishment of joint attention with a robot device on a target from a user;
estimating a position and posture of an optical indication device, which is operated by the user to indicate the target by irradiation of a beam, in response to acquisition of the order; and
specifying, by processing circuitry, a direction of the target indicated by irradiation of the beam based on an estimation result of the position and posture and specifying the target on an environment map representing a surrounding environment based on a specifying result of the direction,
wherein the robot device does not detect the beam indicated by the optical indication device.

7. A non-transitory computer-readable storage medium having computer readable program codes embodied in the computer readable storage medium that, when executed cause a computer to execute:

acquiring an order for encouraging establishment of joint attention with a robot device on a target from a user;

estimating a position and posture of an optical indication device, which is operated by the user to indicate the target by irradiation of a beam, in response to acquisition of the order; and specifying a direction of the target indicated by irradiation of the beam based on an estimation result of the position and posture and specifying the target on an environment map representing a surrounding environment based on a specifying result of the direction, wherein the robot device does not detect the beam indicated by the optical indication device.

8. The robot device according to claim 1, wherein estimating the position and the posture of the optical indication device excludes detecting the beam indicated by the optical indication device.

9. The robot device according to claim 1, wherein estimating the position and the posture of the optical indication device is based only on the optical indication device and not on the beam.

10. The robot device according to claim 1, wherein the environment map specifies elevation differences in the surrounding environment, which surrounds the target.

\* \* \* \* \*